(12) United States Patent
Ramirez Corredores et al.

(10) Patent No.: US 8,853,484 B2
(45) Date of Patent: Oct. 7, 2014

(54) PRODUCTION OF RENEWABLE BIOFUELS

(75) Inventors: Maria Magdalena Ramirez Corredores, Houston, TX (US); Vicente Sanchez Iglesias, Houston, TX (US)

(73) Assignee: KiOR, Inc., Pasadena, TX (US)

( * ) Notice: Subject to any disclaimer, the term of this patent is extended or adjusted under 35 U.S.C. 154(b) by 217 days.

(21) Appl. No.: 13/215,853

(22) Filed: Aug. 23, 2011

(65) Prior Publication Data

US 2012/0172643 A1 Jul. 5, 2012

Related U.S. Application Data

(60) Provisional application No. 61/376,131, filed on Aug. 23, 2010.

(51) Int. Cl.
*C10L 1/04* (2006.01)

(52) U.S. Cl.
USPC ........... 585/733; 585/240; 585/242; 585/469; 585/638; 585/818; 44/605; 44/606; 44/628

(58) Field of Classification Search
USPC ................ 585/240, 242, 469, 638, 733, 818; 44/605–606, 628
See application file for complete search history.

(56) References Cited

U.S. PATENT DOCUMENTS

| 5,877,380 | A | 3/1999 | Conroy et al. |
|---|---|---|---|
| 2008/0210600 | A1* | 9/2008 | O'Connor et al. ............ 208/113 |
| 2009/0151233 | A1 | 6/2009 | Miller |
| 2010/0076238 | A1 | 3/2010 | Brandvold et al. |
| 2010/0162625 | A1 | 7/2010 | Mills |
| 2011/0245489 | A1 | 10/2011 | Steele et al. |

FOREIGN PATENT DOCUMENTS

| CN | 101023154 A | 8/2007 | |
|---|---|---|---|
| WO | WO 2010/033789 A2 * | 3/2010 | ................ C01B 3/38 |

OTHER PUBLICATIONS

Aguado, R. et al. (2000). Ind. Eng. Chem. Res., 39, 1925-1933.*
International Search Report and Written Opinion for co-pending PCT Application No. PCT/US2011/048815, filed Aug. 23, 2011; Dated Mar. 8, 2012; 9 pages.
European Search Report dated Jul. 9, 2014 received in corresponding European Patent Application No. 11820525.1, Applicant: KiOR, Inc., 7 pages.
Douglas C. Elliott et al., Catalytic Hydroprocessing of Biomass Fast Pyrolysis Bio-oil to Produce Hydrocarbon Products, Environmental Progress & Sustainable Energy, vol. 28, No. 3, Oct. 1, 2009, pp. 441-449, EP055126165.
Zhang Qi et al., Review of biomass pyrolysis oil properties and upgrading research, Energy Conversion and Management, Elsevier Science Publishers, vol. 48, No. 1, Jan. 1, 2007, pp. 87-92, XP005708901, Oxford, GB.
Silvia Vivarelli et al., International Workshop Bioenergy for a sustainable development Pyrolysis Oil: An Innovative Liquid Biofuel for Heating the COMBIO Project, retrieved from the internet: http://www.combio-project.com/download/pdf/presentation, Nov. 9, 2004, XP055126151, 30 pages.

* cited by examiner

*Primary Examiner* — Brian McCaig
(74) *Attorney, Agent, or Firm* — Hovey Williams LLP

(57) ABSTRACT

A process and system for separating and upgrading bio-oil into renewable fuels is provided. The process comprises separating bio-oil into a light fraction, an optional intermediate fraction, and heavy fraction based on their boiling points. The light fraction and optional intermediate fraction can be upgraded via hydrotreatment to produce a renewable gasoline and a renewable diesel, which may be combined with their petroleum-derived counterparts. The heavy fraction may be subjected to cracking and further separated into light, intermediate, and heavy fractions in order to increase the yield of renewable gasoline and renewable diesel.

19 Claims, 2 Drawing Sheets

PRODUCTION OF RENEWABLE BIOFUELS

BACKGROUND

1. Field of the Invention

The present invention relates generally to the treatment of bio-oil. More specifically, the invention concerns processes and systems for producing renewable fuels or fuel additives from bio-oil.

2. Description of the Related Art

With the rising costs and environmental concerns associated with fossil fuels, renewable energy sources have become increasingly important. The development of renewable fuel sources provides a means for reducing the dependence on fossil fuels. Accordingly, many different areas of renewable fuel research are currently being explored and developed.

With its low cost and wide availability, biomass has increasingly been emphasized as an ideal feedstock in renewable fuel research. Consequently, many different conversion processes have been developed that use biomass as a feedstock to produce useful biofuels and/or specialty chemicals. Existing biomass conversion processes include, for example, combustion, gasification, slow pyrolysis, fast pyrolysis, liquefaction, and enzymatic conversion. One of the useful products that may be derived from the aforementioned biomass conversion processes is a liquid product commonly referred to as "bio-oil." Bio-oil may be processed into transportation fuels, hydrocarbon chemicals, and/or specialty chemicals.

Despite recent advancements in biomass conversion processes, many of the existing biomass conversion processes produce low-quality bio-oils containing high amounts of oxygen. These bio-oils require extensive secondary upgrading in order to be utilized as transportation fuels and/or as fuel additives due to the high amounts of oxygen present in the bio-oil. Furthermore, these transportation fuels and/or fuel additives derived from bio-oil vary in quality depending on the original oxygen content of the bio-oil.

Bio-oils can be subjected to various upgrading processes in order to process the bio-oil into renewable fuels and/or fuel additives. However, prior upgrading processes have been relatively inefficient and produce renewable fuels and/or fuel additives that have limited use in today's market. Furthermore, only limited amounts of these bio-oil derived transportation fuels and/or fuel additives may be combinable with petroleum-derived gasoline or diesel.

Accordingly, there is a need for an improved process and system for upgrading bio-oil into renewable fuels and/or fuel additives.

SUMMARY OF THE INVENTION

In one embodiment, the present invention is directed to a process for producing a renewable fuel comprising the steps of (a) providing a bio-oil having an oxygen content in the range of 15 to 50 weight percent; (b) separating the bio-oil into at least a light fraction and a heavy fraction; and (c) hydrotreating at least a portion of the light fraction to provide a hydrotreated light fraction. The mid-boiling point of the heavy fraction is at least 100° C. greater than the mid-boiling point of the light fraction.

In another embodiment, the present invention is directed to a process for producing a renewable fuel comprising the steps of (a) thermochemically converting biomass in the presence of a catalyst to produce a bio-oil; (b) fractionating the bio-oil into a light fraction, an intermediate fraction, and a heavy fraction; (c) hydrotreating the light fraction in a first hydrotreater to thereby produce a renewable gasoline composition; and (d) hydrotreating the intermediate fraction in a second hydrotreater to thereby produce a renewable diesel composition. Of the fractions separated during step (b), at least 75 weight percent of the light fraction has a boiling point below 215° C., at least 75 weight percent of the intermediate fraction has a boiling point between 215° C. and 325° C., and at least 75 weight percent of the heavy fraction has a boiling point above 325° C. Additionally, the fractionating of step (b) does not increase the temperature of the bio-oil above 250° C.

In a further embodiment, the present invention is directed to a system for producing renewable fuels comprising a biomass feedstock source for providing solid particulate biomass; a biomass feed system for feeding the solid particulate biomass into a conversion reactor; a conversion reactor for thermally converting at least a portion of the biomass feedstock into a bio-oil; a nonheated fractionator for separating the bio-oil into at least a light fraction and a heavy fraction; and a first hydrotreater for reducing the oxygen content of the light fraction.

BRIEF DESCRIPTION OF THE FIGURES

Embodiments of the present invention are described herein with reference to the following drawing figures, wherein.

DETAILED DESCRIPTION

Figure 1:
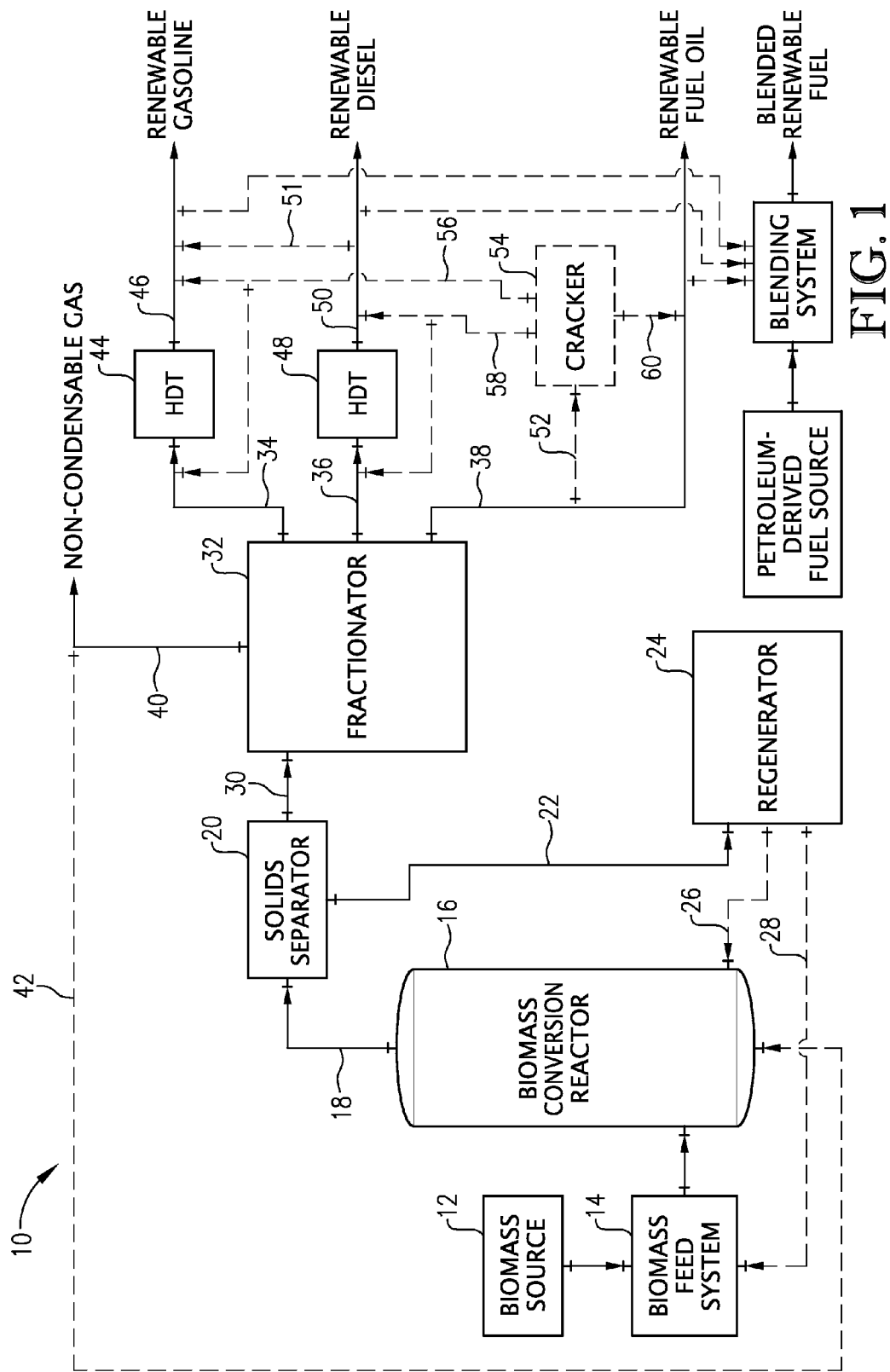
FIG. 1 is a schematic diagram of a biomass conversion system according to one embodiment of the present invention.

FIG. 1 depicts a biomass conversion system 10 that includes a means for upgrading bio-oil into renewable fuels and/or fuel additives. It should be understood that the biomass conversion system shown in FIG. 1 is just one example of a system within which the present invention can be embodied. The present invention may find application in a wide variety of other systems where it is desirable to efficiently and effectively upgrade bio-oil into renewable fuels and/or fuel additives. The exemplary biomass conversion system illustrated in FIG. 1 will now be described in detail.

The biomass conversion system 10 of FIG. 1 includes a biomass source 12 for supplying a biomass feedstock to be converted to bio-oil. The biomass source 12 can be, for example, a hopper, storage bin, railcar, over-the-road trailer, or any other device that may hold or store biomass. The biomass supplied by the biomass source 12 can be in the form of solid particles. The biomass particles can be fibrous biomass materials comprising cellulose. Examples of suitable cellulose-containing materials include algae, paper waste, and/or cotton linters. In one embodiment, the biomass particles can comprise a lignocellulosic material. Examples of suitable lignocellulosic materials include forestry waste such as wood chips, saw dust, pulping waste, and tree branches; agricultural waste such as corn stover, wheat straw, and bagasse; and/or energy crops such as eucalyptus, switch grass, and coppice.

As depicted in FIG. 1, the solid biomass particles from the biomass source 12 can be supplied to a biomass feed system 14. The biomass feed system 14 can be any system capable of feeding solid particulate biomass to a biomass conversion reactor 16. While in the biomass feed system 14, the biomass material may undergo a number of pretreatments to facilitate the subsequent conversion reactions. Such pretreatments may include drying, roasting, torrefaction, demineralization, steam explosion, mechanical agitation, and/or any combination thereof.

In one embodiment, it may be desirable to combine the biomass with a catalyst in the biomass feed system 14 prior to introducing the biomass into the biomass conversion reactor 16. Alternatively, the catalyst may be introduced directly into the biomass conversion reactor 16. The catalyst may be fresh and/or regenerated catalyst. The catalyst can, for example, comprise a solid acid, such as a zeolite. Examples of suitable zeolites include ZSM-5, Mordenite, Beta, Ferrierite, and zeolite-Y. Additionally, the catalyst may comprise a super acid. Examples of suitable super acids include sulfonated, phosphated, or fluorinated forms of zirconia, titania, alumina, silica-alumina, and/or clays. In another embodiment, the catalyst may comprise a solid base. Examples of suitable solid bases include metal oxides, metal hydroxides, and/or metal carbonates. In particular, the oxides, hydroxides, and carbonates of alkali metals, alkaline earth metals, transition metals, and/or rare earth metals are suitable. Other suitable solid bases are layered double hydroxides, mixed metal oxides, hydrotalcite, clays, and/or combinations thereof. In yet another embodiment, the catalyst can also comprise an alumina, such as alpha-alumina.

It should be noted that solid biomass materials generally contain minerals. It is recognized that some of these minerals, such as potassium carbonate, can have catalytic activity in the conversion of the biomass material. Even though these minerals are typically present during the chemical conversion taking place in the biomass conversion reactor 16, they are not considered catalysts.

The biomass feed system 14 introduces the biomass feedstock into a biomass conversion reactor 16. In the biomass conversion reactor 16, biomass is subjected to a conversion reaction that produces bio-oil. The biomass conversion reactor 16 can facilitate different chemical conversion reactions such as fast pyrolysis, slow pyrolysis, liquefaction, gasification, or enzymatic conversion. The biomass conversion reactor 16 can be, for example, a fluidized bed reactor, a cyclone reactor, an ablative reactor, or a riser reactor.

In one embodiment, the biomass conversion reactor 16 can be a riser reactor and the conversion reaction can be fast pyrolysis. More specifically, fast pyrolysis may include catalytic cracking. As used herein, "pyrolysis" refers to the chemical conversion of biomass caused by heating the feedstock in an atmosphere that is substantially free of oxygen. In one embodiment, pyrolysis is carried out in the presence of an inert gas, such as nitrogen, carbon dioxide, and/or steam. Alternatively, pyrolysis can be carried out in the presence of a reducing gas, such as hydrogen, carbon monoxide, noncondensable gases recycled from the biomass conversion process, and/or any combination thereof.

Fast pyrolysis is characterized by short residence times and rapid heating of the biomass feedstock. The residence times of the fast pyrolysis reaction can be, for example, less than 10 seconds, less than 5 seconds, or less than 2 seconds. Fast pyrolysis may occur at temperatures between 200 and 1,000° C., between 250 and 800° C., or between 300 and 600° C.

Referring again to FIG. 1, the conversion effluent 18 exiting the biomass conversion reactor 16 generally comprises gas, vapors, and solids. As used herein, the vapors produced during the conversion reaction may interchangeably be referred to as "bio-oil," which is the common name for the vapors when condensed into their liquid state. In the case of fast pyrolysis, the solids in the conversion effluent 18 generally comprise particles of char, ash, and/or spent catalyst.

The bio-oil exiting the biomass conversion reactor 16 can have an oxygen content in the range of 15 to 50 weight percent. In other embodiments, the bio-oil exiting the biomass conversion reactor 16 can have an oxygen content that is at least 15 weight percent, but less than 35 or 25 weight percent.

As depicted in FIG. 1, the conversion effluent 18 from the biomass conversion reactor 16 can be introduced into a solids separator 20. The solids separator 20 can be any conventional device capable of separating solids from gas and vapors such as, for example, a cyclone separator or a gas filter. The solids separator 20 removes a substantial portion of the solids (e.g., spent catalysts, char, and/or heat carrier solids) from the conversion effluent 18. The solid particles 22 recovered in the solids separator 20 can be introduced into a regenerator 24 for regeneration, typically by combustion. After regeneration, at least a portion of the hot regenerated solids can be introduced directly into the biomass conversion reactor 16 via line 26. Alternatively or additionally, the hot regenerated solids can be directed via line 28 to the biomass feed system 14 for combination with the biomass feedstock prior to introduction into the biomass conversion reactor 16.

The remaining gas and vapor conversion products 30 from the solids separator 20 can be introduced into a fractionator 32. In the fractionator 32, at least a portion of the vapors (bio-oil) may be separated into a light fraction 34, an intermediate fraction 36, and a heavy fraction 38. The light fraction 34 can have a boiling range comparable to petroleum-derived gasoline and the intermediate fraction 36 can have a boiling range comparable to petroleum-derived diesel. Generally, at least 75, 85, or 95 weight percent of the light fraction 34 can have a boiling point less than 215° C., at least 75, 85, or 95 weight percent of the intermediate fraction 36 can have a boiling point between 215 and 325° C., and at least 75, 85, or 95 weight percent of the heavy fraction 38 can have a boiling point above 325° C.

In one embodiment, the light fraction 34 can have a mid-boiling point in the range of 50 to 180° C., 70 to 160° C., or 80 to 140° C. As used herein, "mid-boiling point" refers to the median boiling point temperature of the relevant fraction, where 50 weight percent of the fraction boils above the mid-boiling point and 50 weight percent boils below the mid-boiling point. The intermediate fraction 36 can have a mid-boiling point in the range of 200 to 300° C. or 225 to 275° C. The intermediate fraction 36 can have a mid-boiling point that is between the mid-boiling points of the light fraction 34 and the heavy fraction 38. The heavy fraction 38 can have a mid-boiling point in the range of 340 to 600° C., 350 to 550° C., or 360 to 500° C. The heavy fraction 38 can have a mid-boiling point that is at least 100° C., 125° C., or 150° C. greater than the mid-boiling point of the light fraction.

The fractionation of the liquid bio-oil can be carried out by a nonheated process such as, for example, nonheated distillation, extraction, membrane separation, and/or the partial condensation of the vapor bio-oil. In one embodiment, the fractionator 32 does not increase the temperature of the liquid bio-oil above 250° C., 100° C., 75° C., or 60° C. It should be noted that the fractionation in the fractionator 32 is not carried out by simple heated distillation.

In one embodiment, at least 5, 10, or 15 weight percent and no more than 75, 85, or 95 weight percent of the bio-oil 30 subjected to fractionation is fractionated into the light fraction 34, at least 5, 10, or 15 weight percent and no more than 80, 60, or 40 weight percent of the bio-oil 30 is fractionated into the intermediate fraction 36, and/or at least 5, 10, or 15 weight percent and no more than 80, 60, or 40 weight percent of the bio-oil 30 is fractionated into the heavy fraction 38.

As shown in FIG. 1, non-condensable gases 40 may be removed from the fractionator 32 and, optionally, recycled via line 42 to the biomass conversion reactor 16 for use as a lift gas.

Referring again to FIG. 1, the light fraction 34 removed from the fractionator 32 can be introduced into a first hydrotreater 44. The first hydrotreater 44 may be any conventional hydrotreater commonly known and used in the art. The first hydrotreater removes oxygen from the light fraction 34 to produce a renewable gasoline 46 of reduced oxygen content. The oxygen content of the renewable gasoline 46 can be at least 50, 25, or 10 percent less than the oxygen content of the light fraction 34. In one embodiment, the oxygen content of the renewable gasoline 46 can be less than 10, 5, or 1 weight percent. The renewable gasoline 46 may also have a Total Acid Number (TAN) value that is at least 50, 70, or 90 percent less than the TAN value of the light fraction 34.

As depicted in FIG. 1, the intermediate fraction 36 removed from the fractionator 32 can be introduced into a second hydrotreater 48. The second hydrotreater 48 may be any conventional hydrotreater commonly known and used in the art. The second hydrotreater 48 removes oxygen from the intermediate fraction 36 to produce a renewable diesel 50 of reduced oxygen content. A fraction of the renewable diesel 50 can also be utilized as a gasoline blendstock, and separated out of renewable diesel 50 and combined with renewable gasoline 46 via line 51. The oxygen content of the renewable diesel 50 can be at least 50, 25, or 10 percent less than the oxygen content of the intermediate fraction 36. In one embodiment, the oxygen content of the renewable diesel 50 can be less than 10, 5, or 1 weight percent. The renewable diesel 50 may have a TAN value that is at least 50, 70, or 90 percent less than the TAN value of the intermediate fraction 36.

As depicted in FIG. 1, the heavy fraction 38 may be removed directly from the system and be used as a renewable fuel oil. The renewable fuel oil may be used for heating oil and/or bunker fuel. In another embodiment, all or part of the heavy fraction 38 may be diverted through line 52 into a cracker 54. In one embodiment, the cracker 54 is a unit that includes pretreatment of the feed by hydrotreating. Examples of cracking units employing pretreatment by hydrotreating include residual catalytic cracking (RCC) units and hydrocracking units. When cracker 54 employs pretreatment by hydrotreating, the resulting cracked product may have a TAN value that is at least 50, 70, or 90 percent less than the TAN value of the heavy fraction 38 introduced into the cracker 54. In an alternative embodiment, the cracker 54 does not employ hydrotreating and the TAN of the cracked product is at most the same as the TAN of the heavy fraction 38.

The cracked product produced in cracker 54 can be separated into different fractions based on the boiling points of the respective fractions. For example, the cracked product may be divided into a light cracked fraction 56, an intermediate cracked fraction 58, and/or a heavy cracked fraction 60. In one embodiment, at least 75, 85, or 95 weight percent of the light cracked fraction 56 has a boiling point below 215° C., at least 75, 85, or 95 weight percent of the intermediate cracked fraction 58 has a boiling point between 215 and 325° C., and at least 75, 85, or 95 weight percent of the heavy cracked fraction 60 has a boiling point above 325° C.

As illustrated in FIG. 1, after cracking and separation, at least a portion of the light cracked fraction 56, at least a portion of the intermediate cracked fraction 58, and/or at least a portion of the heavy cracked fraction 60 can be combined with other streams in the bio-oil production process 10. When the cracker employs a hydrotreating step, as discussed above, at least a portion of the light cracked fraction 56 can be combined with at least a portion of the renewable gasoline 46, at least a portion of the intermediate cracked fraction 58 can be combined with at least a portion of the renewable diesel 50, and/or at least a portion of the heavy cracked fraction 60 may be combined with the uncracked heavy fraction 38 to be used as a renewable fuel oil. When the cracker does not employ a hydrotreating step, at least a portion of the light cracked fraction 56 can be combined with at least a portion of the light fraction 34 prior to introduction into the first hydrotreater 44 and/or at least a portion of the intermediate cracked fraction 58 can be combined with at least a portion of the intermediate fraction 36 prior to introduction into the second hydrotreater 48.

The renewable gasoline, renewable diesel, and/or renewable fuel oil produced by the biomass conversion process 10 can subsequently be blended with a petroleum-derived fuel to produce a blended renewable fuel. For example, the renewable gasoline can be blended with a petroleum-derived gasoline in an amount of at least 0.01, 0.1, 1, or 2 percent and no more than 50, 25, or 15 percent by weight of the petroleum-derive gasoline to produce a blended renewable gasoline. The renewable diesel can be blended with a petroleum-derived diesel in an amount of at least 0.01, 0.1, 1, or 2 percent and no more than 50, 25, or 15 percent by weight of the petroleum-derive diesel to produce a blended renewable diesel. The renewable fuel oil can be blended with a petroleum-derived fuel oil in an amount of at least 0.01, 0.1, 1, or 2 percent and no more than 50, 25, or 15 percent by weight of the petroleum-derive fuel oil to produce a blended renewable fuel oil.

Figure 2:
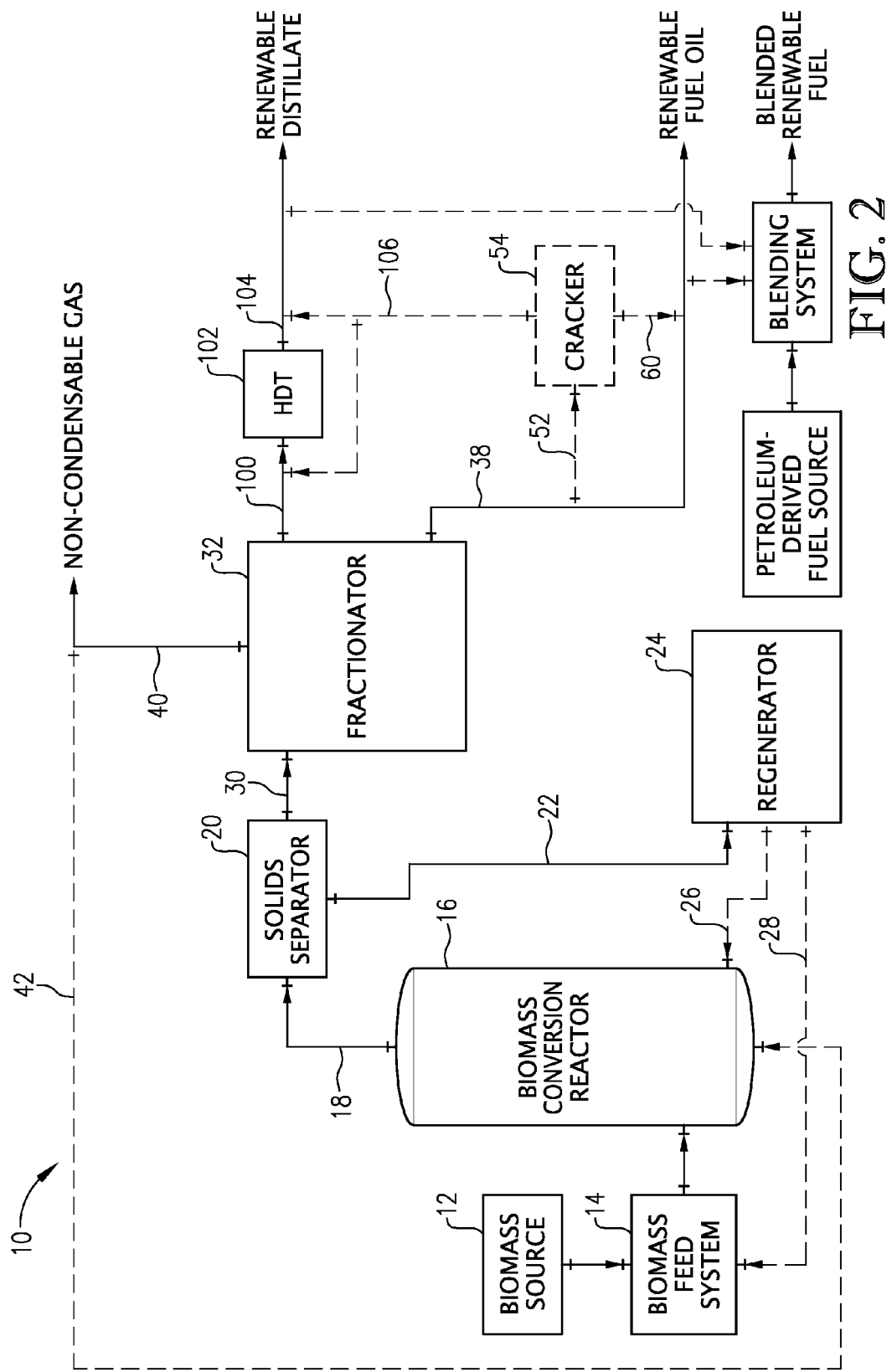
FIG. 2 is a schematic diagram of a biomass conversion system according to another embodiment of the present invention.

FIG. 2 illustrates an alternative embodiment of the present invention where the fractionator only fractionates the bio-oil 30 into two liquid streams: a light fraction 100 and a heavy fraction 38. All of the components in FIG. 2 that have the same numerical reference as that in FIG. 1 have the same function and/or description as set forth above.

In the embodiment depicted in FIG. 2, at least 50, 65, or 75 percent of the bio-oil 30 can be fractionated into the light fraction 100 and at least 10, 20, or 30 weight percent of the bio-oil 30 can be fractionated into a heavy fraction 38. In one embodiment, at least 75, 85, or 95 weight percent of the light fraction has a boiling point below 325° C., whereas at least 75, 85, or 95 weight percent of the heavy fraction has a boiling point above 325° C.

As depicted in FIG. 2, the light fraction 100 can be introduced into a hydrotreater 102. The hydrotreater 102 removes oxygen from the light fraction 100 and produces a renewable distillate 104 of reduced oxygen content. The oxygen content of the renewable distillate 104 can be at least 50, 25, or 10 percent less than the oxygen content of the light fraction 100. In one embodiment, the oxygen content of the renewable distillate 104 can be less than 10, 5, or 1 weight percent. The renewable distillate 104 can also have a TAN value that is at least 50, 70, or 90 percent less than the TAN value of the light fraction 100.

In one embodiment, at least a portion of the heavy fraction 38 may be used directly as a renewable fuel oil. In another embodiment, all or part of the heavy fraction 52 can be introduced into a cracker 54 to produce a cracked product. When the cracker 54 employs a hydrotreating step, the resulting cracked product can have a TAN value that is at least 50, 70, or 90 percent less than the TAN value of the heavy fraction 52.

The cracked product in the cracker 54 can be separated into a light cracked product 106 and a heavy cracked product 60. In one embodiment, at least 75, 85, or 95 weight percent of the light cracked product 106 has a boiling point below 325° C., whereas at least 75, 85, or 95 weight percent of the heavy cracked product 60 has a boiling point above 325° C. When the cracker 54 employs a hydrotreating step, at least a portion of the light cracked product 106 may be combined with the renewable distillate 104, while at least a portion of the heavy cracked product 60 may be combined with the renewable fuel oil 38. When the cracker 54 does not employ a hydrotreating step, at least a portion of the light cracked product 106 may be combined with the light fraction 100 upstream of the hydrotreater 102.

The renewable distillate and/or renewable fuel oil produced by the biomass conversion process 10 of FIG. 2 can subsequently be blended with a petroleum-derived fuel to produce a blended renewable fuel. For example, the renewable distillate can be blended with a petroleum-derived distillate in an amount of at least 0.01, 0.1, 1, or 2 percent and no more than 50, 25, or 15 percent by weight of the petroleum-derive distillate to produce a blended renewable distillate. The renewable fuel oil can be blended with a petroleum-derived fuel oil in an amount of at least 0.01, 0.1, 1, or 2 percent and no more than 50, 25, or 15 percent by weight of the petroleum-derive fuel oil to produce a blended renewable fuel oil.

EXAMPLES

Example 1

A bio-oil, derived from the thermo-catalytic conversion of biomass and containing about 16.2 wt % oxygen, was separated into a light fraction and a heavy fraction by molecular distillation. The maximum temperature for the separation was 75° C. The mid-boiling point of the heavy fraction was 241.6° C., which is over 100° C. higher than the mid-boiling point of the light fraction, which was 135.6° C. The boiling profiles for each of the streams were determined by simulated distillation. The quantities of light and heavy fractions obtained were 12 wt %, and 83 wt %, respectively, based on the total weight of the bio-oil (bio-oil water, ~4 wt % was also recovered and decanted from the light fraction). A portion of the light fraction was then hydrotreated under the following conditions, 300-375° C., 800-2000 psi and LHSV=0.5-3 h$^{-1}$, over a typical Nickel and Molybdenum containing commercial hydrotreating catalyst. Results of the separation and hydrotreatment are shown in Table 1 below.

TABLE 1

|  | Bio-oil | Heavy Fraction | Light Fraction | Hydrotreated Light Fraction |
|---|---|---|---|---|
| Mid-boiling point | 224.8 | 241.6 | 135.6 | 127.0 |
| Boiling Point Range | 28.8-523.8 | 36.3-524.7 | 24.7-217.7 | 51.4-210.4 |
| Oxygen Content | 16.2 | 13.9 | 9.5 | <0.15 |
| TAN | 5.3 | 6.7 | 9.0 | 0 |
| Wt % boiling below 215 C. | 44 | 28 | 99 | 100 |
| Wt % boiling above 325 C. | 24 | 28 | 0 | 0 |

The hydrotreated light fraction exhibited a boiling profile in a range equivalent to commercially available petroleum derived gasoline. Thus, the hydrotreated light fraction, produced from first fractionating the bio-oil followed by hydrotreatment, showed to be a clear, transparent and colorless hydrocarbon gasoline blendstock and to have undetectable levels of oxygen and TAN.

Example 2

A bio-oil, derived from the thermo-catalytic conversion of biomass and containing about 16.2 wt % oxygen, was separated into a light fraction, an intermediate fraction and a heavy fraction by molecular distillation. The maximum temperature for the separation was 120° C. The mid-boiling point of the intermediate fraction was 255.3° C., which is over 100 C higher than the mid-boiling point of the light fraction, which was 153.7° C. The boiling profiles for each of the streams were determined by simulated distillation. The quantities of light and intermediate fractions obtained were 14 wt %, and 38 wt %, respectively, based on the total weight of the bio-oil. A portion of each of these fractions was then hydrotreated under the following conditions, 300-375° C., 800-2000 psi and LHSV=0.5-3 h$^{-1}$, over a typical Nickel and Molybdenum containing commercial hydrotreating catalyst. Results of the separation and hydrotreatment are shown in Table 2 below.

TABLE 2

|  | Bio-oil | Heavy Fraction | Intermediate Fraction | Light Fraction | Hydrotreated Intermediate Fraction | Hydrotreated Light Fraction |
|---|---|---|---|---|---|---|
| Mid-boiling point | 224.8 | 338.9 | 255.3 | 153.7 | 235 | 127.0 |
| Boiling Point Range | 28.8-523.8 | 166.2-530.4 | 85-400 | 57.3-221.7 | 100-410 | 51.4-210.4 |
| Oxygen Content | 16.2 | 21.6 | 14.2 | 11.5 | 0.01 | <0.15 |
| TAN | 5.3 | 4.2 | 7.05 | 15.8 | 0 | 0 |
| Wt % boiling below 215 C. | 44 | 7 | 41 | 97 | 35 | 100 |
| Wt % boiling between 215 C. and 325 C. | 32 | 36 | 56 | 3 | 55 | 0 |
| Wt % boiling above 325 C. | 24 | 67 | 3 | 0 | 10 | 0 |

As in Example 1, the hydrotreated light fraction exhibited a boiling profile in a range equivalent to commercially available petroleum derived gasoline, while the hydrotreated intermediate fraction exhibited that of commercially available petroleum derived diesel. Thus, the hydrotreated light fraction, produced from first fractionating the bio-oil followed by hydrotreatment, showed to be a clear, transparent and colorless hydrocarbon gasoline blendstock. The intermediate fraction, produced from first fractionating the bio-oil followed by hydrotreatment, showed to be a clear, transparent and light yellowish hydrocarbon diesel blendstock, which also included a fraction of gasoline range blendstock material. Both the hydrotreated light fraction and the hydrotreated intermediate fraction showed to have undetectable levels of oxygen and TAN.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

It is the inventors' intent to rely on the Doctrine of Equivalents to determine and assess the reasonably fair scope of the present invention as it pertains to any processes and systems not materially departing from but outside the literal scope of the invention as set forth in the following claims.

What is claimed is:

1. A process for producing a renewable fuel, said process comprising:
(a) utilizing a bio-oil having an oxygen content in the range of 15 to 50 weight percent;
(b) separating said bio-oil into at least a light fraction and a heavy fraction, wherein the mid-boiling point of said heavy fraction is at least 100° C. greater than the mid-boiling point of said light fraction;
(c) hydrotreating at least a portion of said light fraction to thereby provide a hydrotreated light fraction; and
(d) blending said hydrotreated light fraction with a petroleum-derived distillate or a petroleum-derived gasoline.

2. The process of claim 1 wherein said separating of step (b) does not increase the temperature of said bio-oil above 250° C.

3. The process of claim 1 wherein at least 30 weight percent of said bio-oil subjected to said separating of step (b) is separated into said light fraction, wherein at least 10 weight percent of said bio-oil subjected to said separating of step (b) is separated into said heavy fraction.

4. The process of claim 1 wherein at least 75 weight percent of said light fraction has a boiling point below 325° C., wherein at least 75 weight percent of said heavy fraction has a boiling point above 325° C.

5. The process of claim 1 wherein said bio-oil has an oxygen content in the range of 15 to 25 weight percent.

6. The process of claim 1 wherein the oxygen content of said hydrotreated light fraction is less than 50 percent of the oxygen content of said light fraction.

7. The process of claim 1 wherein said hydrotreated light fraction has a TAN value that is at least 50 percent less than the TAN value of said light fraction.

8. The process of claim 1 further comprising cracking at least a portion of said heavy fraction to thereby provide a cracked product.

9. The process of claim 8 wherein said cracking includes pretreatment by hydrotreating, wherein the TAN value of said cracked product is at least 50 percent less than the TAN value of said heavy fraction.

10. The process of claim 8 further comprising combining at least a portion of said cracked product with at least a portion of said light fraction and/or with at least a portion of said hydrotreated light fraction.

11. The process of claim 1 wherein said separating of step (b) includes further separating said bio-oil into an intermediate fraction having a mid-boiling point between the mid-boiling points of said light fraction and said heavy fraction.

12. The process of claim 11 wherein at least 75 weight percent of said light fraction has a boiling point below 215° C., wherein at least 75 weight percent of said intermediate fraction has a boiling point between 215° C. and 325° C., wherein at least 75 weight percent of said heavy fraction has a boiling point above 325° C.

13. The process of claim 1 wherein said utilizing of step (a) includes thermochemically converting lignocellulosic biomass by fast pyrolysis in a riser reactor.

14. The process of claim 1 wherein said separating of step (b) is carried out by nonheated distillation, extraction, membrane separation, and/or partial condensation.

15. A process for producing a renewable fuel, said process comprising:
(a) utilizing a bio-oil having an oxygen content in the range of 15 to 50 weight percent;
(b) separating said bio-oil into at least a light fraction and a heavy fraction, wherein the mid-boiling point of said heavy fraction is at least 100° C. greater than the mid-boiling point of said light fraction; and
(c) hydrotreating at least a portion of said light fraction to thereby provide a hydrotreated light fraction,
wherein said separating of step (b) includes further separating said bio-oil into an intermediate fraction having a mid-boiling point between the mid-boiling points of said light fraction and said heavy fraction,
wherein said process further comprises hydrotreating at least a portion of said intermediate fraction to produce a hydrotreated intermediate fraction.

16. A system for producing a bio-oil, said system comprising:
a biomass feedstock source configured to provide solid particulate biomass;
a petroleum-derived fuel source configured to provide petroleum-derived gasoline and/or petroleum-derived distillate;
a biomass feed system operatively connected to the biomass feedstock source and configured to feed said solid particulate biomass into a conversion reactor;
a conversion reactor operatively connected to the biomass feed system and configured to thermally convert at least a portion of said biomass feedstock into a bio-oil;
a fractionator operatively connected to the outlet of the conversion reactor and adapted to separate said bio-oil into at least a light fraction and a heavy fraction;
at least one hydrotreater containing a catalyst configured to reduce the oxygen content of said light fraction and produce a hydrotreated light fraction, wherein the hydrotreater is operatively connected to an outlet of the fractionator; and
a blending system operatively connected to at least one hydrotreater and configured to blend at least a portion of said hydrotreated light fraction from said hydrotreater with said petroleum-derived gasoline and/or distillate from said petroleum-derived fuel source.

17. The system of claim 16 wherein said fractionator is further operable to produce a separate intermediate fraction, wherein said system further comprises a second hydrotreater adapted to reduce the oxygen content of said intermediate fraction.

18. The system of claim 16 further comprising a cracker for cracking said heavy fraction.

19. The system of claim 16 wherein said fractionator comprises a nonheated distillation column, and extraction column, a membrane separator, and/or a partial condenser.

* * * * *